UNIVERSALLY ADAPTABLE CONDUCTIVE-CIRCUIT BOARD
Filed April 28, 1958
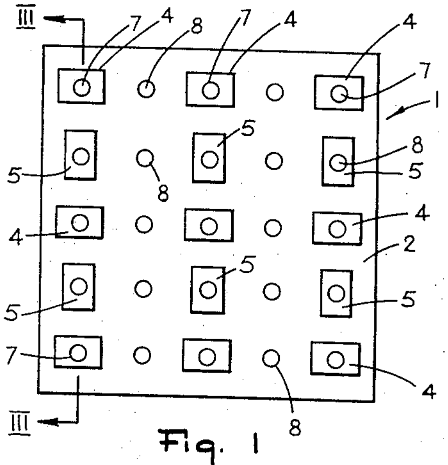
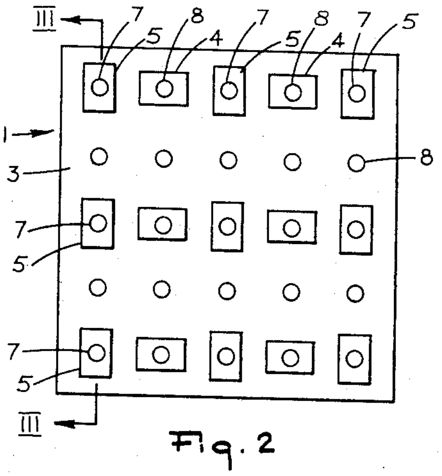
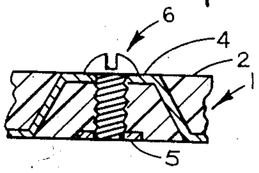
Fig. 4
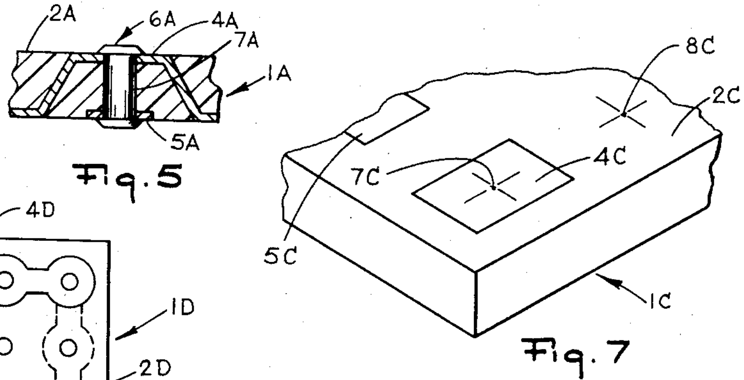
Fig. 5, Fig. 7
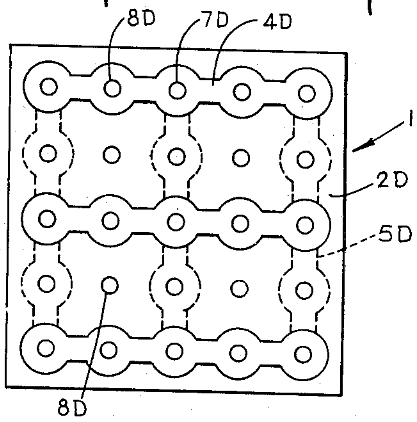
Fig. 8
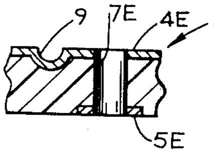
Fig. 9
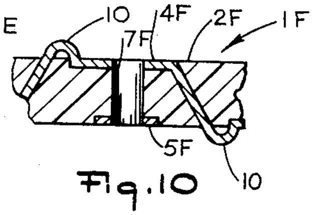
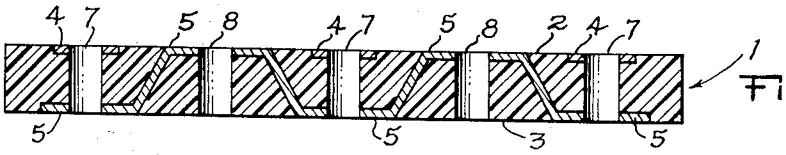
Fig. 3
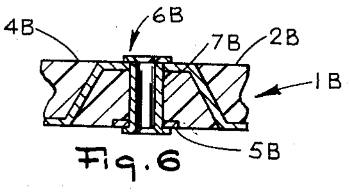
INVENTOR.
FRANK L. DAHL United States Patent Office 2,883,447 Patented Apr. 21, 1959

2,883,447

UNIVERSALLY ADAPTABLE CONDUCTIVE-CIRCUIT BOARD

Frank L. Dahl, Los Angeles, Calif.

Application April 28, 1958, Serial No. 731,178

8 Claims. (Cl. 174—84)

Generally speaking, the present invention relates to a so-called "printed circuit"—in other words, to a suitable base of electrically non-conductive material provided with electrically conductive portions carried thereby which electrically correspond to the wires of an electric circuit and which are adapted to be connected to a variety of components to produce any of a variety of electrical devices which include electric circuitry interconnecting elements thereof. More particularly, the present invention relates to a universally adaptable conductive-circuit board which includes a plurality of electrically isolated strips of electrically conductive material carried by a sheet of electrically non-conductive material in a generally grid-like arrangement with certain of said strips comprising a first group which are substantially perpendicular to a second group of such strips and arranged to be selectively connected in virtually any desired manner at virtually any desired number of connection points by inserting any desired number of electrically conductive connection means through the sheet of electrically non-conductive material into electrical contact with opposed strips at points of super-imposition thereof, whereby to make it possible to very easily and simply construct virtually any desired type of electric circuit and arrange for connection thereof to virtually any desired types and numbers of circuit elements or components, thus clearly providing a universally adaptable conductive-circuit board.

Various types of prior art so-called "printed circuits" have been developed, such as circuits consisting of electrically conductive material deposited on the surface of an electrically non-conductive material in a predetermined circuit pattern, circuits having a predetermined pattern of conductive material on a non-conductive base provided by selective etching action, circuits having a predetermined pattern of electrically conductive material on an electrically non-conductive base produced mechanically, etc. However, all of these have in common the fact that they are not universally adaptable so that a user thereof can quickly produce virtually any desired circuit arrangement in order to produce any selected electrical apparatus.

It should be noted that the universally adaptable conductive-circuit board of the present invention was invented for the purpose of overcoming the above-mentioned disadvantages of prior art so-called "printed circuits," which it does by being fully adaptable for having various of the conductive strips connected in virtually any selected manner to provide virtually any desired type of electric circuit.

With the above points in mind, it is an object of the present invention to provide a universally adaptable conductive-circuit board including a plurality of electrically isolated physically separated strips of electrically conductive material carried by a sheet of electrically non-conductive material in a manner such as to be easily connected together at any of a great number of points of superimposition of said strips by controllably insertible electrically conductive connection means extending through the sheet of electrically conductive material into electrical contact with the strips to be joined, and wherein controllable connection to individual strips may also be provided by similar connection means, such as for connection to exterior or auxiliary circuit elements or the like.

It is a further object of the present invention to provide a device of the character set forth in the preceding object wherein said connection means comprises metallic screw or rivet means.

It is a further object of the present invention to provide a device of the character set forth in either of the preceding objects, wherein said electrically conductive strips are divided into a first group of substantially parallel electrically isolated and physically separated strips and a second group of substantially parallel electrically isolated and physically separated strips, with the strips of each group being mounted alternately on one surface of said sheet of electrically non-conductive material, then extending therethrough, and then being mounted alternately on the other surface of said sheet of electrically non-conductive material and being mutually perpendicular to the strips of the other group, thereby providing an effectively woven structural relationship between said first and second groups of strips.

It is a further object of the present invention to provide a device of the character set forth in any of the preceding objects, except the immediately preceding object, wherein said strips consist of first and second groups of strips, with said first group of strips being carried on one surface of said sheet of electrically non-conductive material, and with said second group of strips being carried on the other surface of said sheet of non-conductive material, with the strips in said first group being substantially parallel and with the strips in said second group being substantially parallel and perpendicular to the strips of said first group.

It is a further object of the present invention to provide a device of the character set forth in any of the preceding objects, wherein said strips have a plurality of projections extending thereabove and above the corresponding surface of said sheet of electrically non-conductive material to facilitate removal of any of said projections whereby to controllably electrically isolate selected portions of any of said strips.

It is a further object of the present invention to provide a device of the character set forth in any of the preceding objects wherein said strips have a plurality of extension portions, including longitudinally excess electrically conductive material, to prevent breaking of said strips during forming, shaping, or bending of the conductive-circuit board into a configuration other than flat.

Other and allied objects will be apparent to those skilled in the art after a careful study of the accompanying illustrations, the present specification, and the appended claims.

To facilitate understanding, reference will be made to the hereinbelow-described drawing, in which:

Fig. 1 is a top plan view of one illustrative embodiment of the present invention taking the form of a universally adaptable conductive-circuit board having a relatively small number of conductive strips—it being understood that this is done for purposes of drawing simplification only since the circuit board may comprise a very large number of conductive strips, if desired;

Fig. 2 is a bottom plan view of Fig. 1;

Fig. 3 is an enlarged vertical sectional view taken in the direction of the arrows III—III in Fig. 1 and in Fig. 2;

Fig. 4 is an enlarged fragmentary detail in vertical section showing the selected connection of two strips on opposite sides of the circuit board by controllably insertible electrically conductive connection means taking the form of a metallic screw;

Fig. 5 is a view similar to Fig. 4 but shows a slightly modified form of connection means comprising a solid rivet;

Fig. 6 is a view similar to Figs. 4 and 5 but shows another slightly modified form of connection means which comprises a hollow rivet or eyelet;

Fig. 7 is an enlarged fragmentary perspective view of one corner of the circuit board shown in Figs. 1 and 2 with a slight modification embodied, however, which consists of connection hole marking means instead of the connection hole means shown in Figs. 1, 2, and 3;

Fig. 8 is a view similar to Fig. 1 but shows a slightly modified form of the invention wherein the strips of the two different groups of strips do not alternately extend to opposite surfaces of the circuit board so as to provide an effectively woven structural relationship between the first and second groups of strips, but wherein each of said groups of strips lies entirely on a different one of the two surfaces of the electrically non-conductive material positioned therebetween;

Fig. 9 is an enlarged fragmentary sectional view illustrating a slight modification of the present invention wherein the strips have a plurality of extension portions including longitudinally excess electrically conductive material to prevent breaking of said strips during bending, shaping, or forming of the conductive-circuit board; and Fig. 10 is an enlarged fragmentary sectional view illustrating another slight modification of the present invention wherein the strips of conductive material have a plurality of projections extending thereabove and above the corresponding surface of the sheet of material to facilitate removal of any of said projections whereby to controllably electrically isolate selected portions of any of said strips.

Generally speaking, the present invention includes a sheet of electrically non-conductive material comprising a circuit board or base. In the specific example illustrated, this sheet is indicated generally at 1 and has a top surface 2 and a bottom surface 3, and is of substantially flat rectangular configuration. This sheet may be made of molded plastic material or may be of any suitable electrically non-conductive material.

Also generally speaking, the present invention includes a first group of substantially parallel electrically isolated and physically separated strips and a second group of substantially parallel electrically isolated and physically separated strips, with said first and second groups of strips being mutually perpendicular. In the specific example illustrated in Figs. 1–3 the strips of said first group of strips are indicated in part by the reference numeral 4, while the strips of said second group of strips are indicated in part by the reference numeral 5. In the specific example illustrated in Figs. 1–3, each of the strips 4, 5 is preferably of metallic construction, such as copper, silver, or the like, although not so limited, and is carried by alternate surfaces, indicated at 2 and 3, of the sheet of electrically non-conductive material 1 with all of the strips 4 being parallel and perpendicular to all of the strips 5 which are also parallel. In other words, for purposes of explanation of the alternating mutually perpendicular arrangement of the two groups of conductive strips 4 and 5, which provide an effectively woven structural relationship therebetween, the positioning of one exemplary strip 5 is clearly shown in the sectional view comprising Fig. 3. In this example, it will be seen that the conductive strip 5 starts at the top of the sheet of electrically non-conductive material 1 on the bottom surface 3 thereof and then extends upwardly therethrough to a position on the top surface 2 of said sheet 1 and then extends downwardly therethrough to a position on the bottom surface 3 of said sheet 1 and then extends upwardly therethrough to a position on the top surface 2 of said sheet 1 and then extends downwardly therethrough to a position on the bottom surface 3 of the sheet 1. Each of the other strips 5 is similarly arranged and each of the horizontal alternating strips 4 is also similarly arranged. Incidentally, in Fig. 3 it should be noted that portions of each of said horizontal strips 4 which lie on the top surface 2 of the sheet of electrically non-conductive material 1 are clearly shown in opposition in Fig. 3 on the opposite surface (top surface) of the sheet 1 directly opposite those portions of the strip 5 which lie on the bottom surface 3 of the sheet 1 at points of superimposition thereof.

Also generally speaking, the present invention may include at least one controllably insertible electrically conductive connection means adapted to extend through the sheet of electrically non-conductive material into electrical contact with at least one strip of said first group and at least one strip of said second group at one or more points of superimposition of said strips. In the specific example illustrated in Fig. 4, said connection means is indicated generally at 6 and takes the form of a metallic screw passing through one of the points of superimposition of one of the conductive strips 5 and one of the conductive strips 4 whereby to effectively electrically connect same.

Also generally speaking, one form of the present invention may include a plurality of connection hole means in the sheet of electrically non-conductive material and/or said strips of said first group and/or said strips of said second group at points of superimposition thereof. In the specific example illustrated in Figs. 1–3, said connection hole means are indicated in part at 7 and are positioned at each of the points of superimposition at opposite sides of the sheet of electrically non-conductive material 1 of the strips 4 and 5 whereby controllably insertible electrically conductive connection means, such as referred to hereinbefore, and one specific metallic screw form of which is indicated at 6 in Fig. 4, may be passed therethrough to effectively connect the strips 5 and 4 on opposite surfaces of the sheet of electrically non-conductive material 1 at said points of superimposition. Additional holes are indicated at 8 and are generally similar to the connection hole 7 except that they are not located at points of superimposition of the strips 4 and 5. It will be noted that certain of the holes 8 are located in regions which do not carry either of the strips 4 or 5 on either surface thereof, thereby rendering said holes suitable for the purpose of physically mounting various other auxiliary devices with respect to the circuit board 1, or suitable for use in mounting the circuit board 1 with respect to some other structure. It should also be noted that certain other of the holes 8 are located so as to pass through one or the other of the strips 4 or 5 but not at points of superimposition thereof, thereby rendering them suitable for making electrical connection to individual ones of said strips 4 or 5.

Fig. 5 illustrates a slight modification of the connection means shown in Fig. 4, and similar parts will be indicated by the same reference numerals, followed by the letter "A," however. In this modification, the connection means takes the form of a rivet 6A inserted through the hole 7A and effectively electrically connecting together the strip 5A and the strip 4A.

Fig. 6 illustrates another slight modification of the connection means shown in Figs. 4 and 5, and similar parts will be indicated by the same reference numerals, followed by the letter "B," however. In this modification the connection means takes the form of a hollow rivet or eyelet 6B inserted through the hole 7B and effectively electrically connecting together the strip 5B and the strip 4B.

Fig. 7 illustrates, in fragmentary form, a slight modification of the invention, and similar parts will be indicated by the same reference numerals, followed by the letter "C," however. In this modification there are no connection hole means such as those indicated at 7 in Figs. 1–3 illustrating the first form of the invention—instead this modification has a connection hole marking means comprising depressed markings 7C which indicate to a user of the circuit board where he should drill holes for suitable connection of the conductive strips by connection means of the type illustrated in Figs. 4, 5, or 6. It should also be noted that, in this modification, there are no holes similar to the holes 8 in the first form of the invention illustrated in Figs. 1–3 and that instead hole marking means 8C indicate the location where such holes may be drilled for the same purposes as the holes 8 in the first form of the present invention.

Fig. 8 illustrates a modified form of the invention, and similar parts will be indicated by the same reference numerals, followed by the letter "D," however. In this modification all of the conductive strips 4D are on the top surface 2D of the electrically non-conductive-circuit board 1D while all of the strips 5D are carried by the opposite surface of the circuit board 1D. In other words, in this modification, the strips do not alternately pass through the sheet of electrically non-conductive material 1D in the manner illustrated in Fig. 3 showing the first form of the present invention.

Fig. 9 illustrates in fragmentary form a slight modification of Fig. 8 and similar parts will be indicated by the same reference numerals, followed by the letter "E," however. In this modification a fragmentary portion of one of the conductive strips 4E is provided with a plurality of extension portions taking the form of longitudinally excess electrically conductive material, such as that indicated at the fold 9, adapted to allow the entire circuit board 1E to be formed in configurations other than flat without breaking the strip 4E. In other words, the fold portion 9 in the strip 4E amounts to an expansion portion. It should be understood that any desired number of the other strips 4E and the strips 5E may be similarly provided with expansion portions similar to that shown at 9.

Fig. 10 illustrates, in fragmentary form, a slight modification of the first form of the invention and similar parts will be indicated by the same reference numerals, followed by the letter "F," however. In this modification a fragmentary portion of one of the conductive strips 4F is provided with a plurality of projections such as indicated at 10 extending thereabove and above the corresponding surface 2F of the sheet of material 1F to facilitate removal of any of the projections 10 by cutting, filing, or otherwise physically removing same, whereby to controllably electrically isolate selected portions of any of said strips. It should be understood that any of the strips 4F and/or any of the strips 5F may similarly be provided with any of a desired number of projections similar to the one shown at 10 in Fig. 10 for this circuit-breaking purpose.

It should be noted that the circuit board 1 may be of a thermoplastic resin, a thermosetting resin, or various other suitable insulating materials and that the conductive strips may be carried flush with the surface thereof or may actually project thereabove. Furthermore, the portions of the conductive strips around the connection holes or points of superimposition of said strips may be round or have other suitable shapes adapted to facilitate cooperation thereof with the insertible connection means adapted to be placed in contact therewith.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A universally adaptable conductive-circuit board, comprising: a substantially flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips.

2. A universally adaptable conductive-circuit board, comprising: a substantially flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; a plurality of connection hole marking means in said sheet of material, said strips of said first group, and said strips of said second group, at points of superimposition thereof.

3. A universally adaptable conductive-circuit board, comprising: a substantialy flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; a plurality of connection hole means in said sheet of material, said strips of said first group, and said strips of said second group, at points of superimposition thereof.

4. A universally adaptable conductive-circuit board, comprising: a substantially flat sheet of electrically non-conductive material; a first group of substantially parallel electricaly isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; and at least one controllably insertible electrically conductive connection means extending through said sheet of material into electrical contact with at least one strip of said first group and at least one strip of said second group at a point of superimposition of said strips, said connection means comprising metallic screw means.

5. A universally adaptable conductive-circuit board, comprising: a substantially flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; a plurality of connection hole marking means in said sheet of material, said strips of said first group, and said strips of said second group, at points of superimposition thereof; and at least one controllably insertible electrically conductive connection means extending through said connection hole marking means into electrical contact with at least one strip of said first group and at least one strip of said second group at a point of superimposition of said strips.

6. A universally adaptable conductive-circuit board, comprising: a substantially flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; a plurality of connection hole means in said sheet of material, said strips of said first group, and said strips of said second group, at points of superimposition thereof; and at least one controllably insertible electrically conductive connection means extending through said connection hole means into electrical contact with at least one strip of said first group and at least one strip of said second group at a point of superimposition of said strips.

7. A universally adaptable conductive-circuit board, comprising: a substantially flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; said strips having a plurality of projections extending thereabove and above the corresponding surface of said sheet of material to facilitate removal of any of said projections whereby to controllably electrically isolate selected portions of any of said strips.

8. A universally adaptable conductive-circuit board, comprising: a substantially flat sheet of electrically non-conductive material; a first group of substantially parallel electrically isolated and physically separated strips of electrically conductive material and a second group of substantially parallel electrically isolated and physically separated strips of electrically conductive material, each of the strips of each group being mounted alternately on one surface of said sheet of material, then extending through said sheet of material, and then being mounted alternately on the other surface of said sheet of material and being mutually perpendicular to the strips of the other group, thereby providing an effectively woven structural relationship between said first and second groups of strips; said strips having a plurality of extension portions including longitudinally excess electrically conductive material to prevent breaking of said strips during bending of the conductive-circuit board.

References Cited in the file of this patent

UNITED STATES PATENTS

| | | |
|---|---|---|
| 290,845 | Breckenridge | Dec. 25, 1883 |
| 2,014,524 | Franz | Sept. 17, 1935 |
| 2,066,511 | Arlt | Jan. 5, 1937 |
| 2,600,169 | Lamb | June 10, 1952 |
| 2,652,444 | Dansard | Sept. 15, 1953 |

FOREIGN PATENTS

| | | |
|---|---|---|
| 644,565 | Great Britain | Oct. 11, 1950 |

OTHER REFERENCES

Publication I, "A Universal Printed Circuit," by Goodykoontz, published in Tele-Tech and Electronic Industries, December 1954 (pages 74, 75 and 146–149 relied on). Copy in the Scientific Library and Div. 20, Class 339–17C.